United States Patent
Vining et al.

(10) Patent No.: US 11,133,841 B2
(45) Date of Patent: Sep. 28, 2021

(54) DATA TRANSMISSION VIA POWER LINE

(71) Applicant: TEXAS INSTRUMENTS INCORPORATED, Dallas, TX (US)

(72) Inventors: Suzanne Mary Vining, Plano, TX (US); Gary Chard, Murphy, TX (US); Win Naing Maung, Plano, TX (US); Mark Alan McAdams, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/778,864

(22) Filed: Jan. 31, 2020

(65) Prior Publication Data

US 2020/0313723 A1 Oct. 1, 2020

Related U.S. Application Data

(60) Provisional application No. 62/826,204, filed on Mar. 29, 2019.

(51) Int. Cl.
*H04B 3/54* (2006.01)
*G06F 13/42* (2006.01)

(52) U.S. Cl.
CPC ........... *H04B 3/54* (2013.01); *G06F 13/4282* (2013.01); *G06F 2213/0042* (2013.01)

(58) Field of Classification Search
CPC .............. G06F 13/40; G06F 13/4282; G06F 2213/0042; G06F 13/4045; H04L 25/20; H04B 3/54
See application file for complete search history.

(56) References Cited

U.S. PATENT DOCUMENTS

| | | | | |
|---|---|---|---|---|
| 5,105,293 | A | * | 4/1992 | Bortolini .................. H04J 14/02 398/141 |
| 2005/0278472 | A1 | * | 12/2005 | Gierke ................. G06F 13/4045 710/313 |
| 2008/0235418 | A1 | * | 9/2008 | Werthen ................. G06F 13/385 710/106 |
| 2010/0185796 | A1 | * | 7/2010 | Schneider ............. G06F 13/385 710/63 |
| 2014/0006674 | A1 | | 1/2014 | Chan et al. |
| 2014/0132083 | A1 | | 5/2014 | Marchand et al. |
| 2016/0162430 | A1 | | 6/2016 | Ma et al. |
| 2016/0269126 | A1 | * | 9/2016 | Maung .............. H04L 12/40032 |

FOREIGN PATENT DOCUMENTS

WO 2017003610 1/2017

OTHER PUBLICATIONS

International Search Report in corresponding PCT Application No. PCT/US2020/025663, dated Jun. 4, 2020 (2 pages).

* cited by examiner

*Primary Examiner* — Sophia Vlahos
(74) *Attorney, Agent, or Firm* — John R. Pessetto; Charles A. Brill; Frank D. Cimino

(57) ABSTRACT

At least some aspects of the present disclosure provide for a method. In some examples, the method includes receiving 2-line data in an embedded Universal Serial Bus (eUSB) format. The method further includes encoding the 2-line data into a single signal. The single signal comprises a first symbol corresponding to a first state change of the 2-line data and a second symbol corresponding to a second state change of the 2-line data.

14 Claims, 4 Drawing Sheets

DATA TRANSMISSION VIA POWER LINE

CROSS-REFERENCE TO RELATED APPLICATIONS

The present application claims priority to U.S. Provisional Patent Application No. 62/826,204, which was filed Mar. 29, 2019, is titled "Full Speed eUSPr Over USB Charging Power Line," and is hereby incorporated herein by reference in its entirety.

SUMMARY

At least some aspects of the present disclosure provide for a circuit. In at least some examples, the circuit includes a Universal Serial Bus (USB) device configured to output 2-line data in a USB format. The circuit further includes an embedded USB (eUSB2) repeater coupled to the USB device and configured to convert the 2-line data in the USB format to 2-line data in an eUSB2 format. The circuit further includes an eUSB2 to power line (e2pwr) repeater coupled to the eUSB2 repeater and configured to encode the 2-line data into a single transmission signal.

Other aspects of the present disclosure provide for a system. In at least some examples, the system includes a device and a peripheral device. This device comprises a USB host device configured to communicate 2-line data in a USB format. The device further comprises an eUSB repeater coupled to the USB device and configured to convert the 2-line data between the USB format and an eUSB2 format. The device further comprises an e2pwr repeater coupled to the eUSB2 repeater and configured to encode the 2-line data into a single transmission signal. The peripheral device comprises a second e2pwr repeater configured to receive the single transmission signal and decode the single transmission signal to recover the 2-line data in the eUSB2 format.

Other aspects of the present disclosure provide for a method. In some examples, the method includes receiving 2-line data in an eUSB format. The method further includes encoding the 2-line data into a single signal. The single signal comprises a first symbol corresponding to a first state change of the 2-line data and a second symbol corresponding to a second state change of the 2-line data

BRIEF DESCRIPTION OF THE DRAWINGS

For a detailed description of various examples, reference will now be made to the accompanying drawings in which.

DETAILED DESCRIPTION

Figure 1:
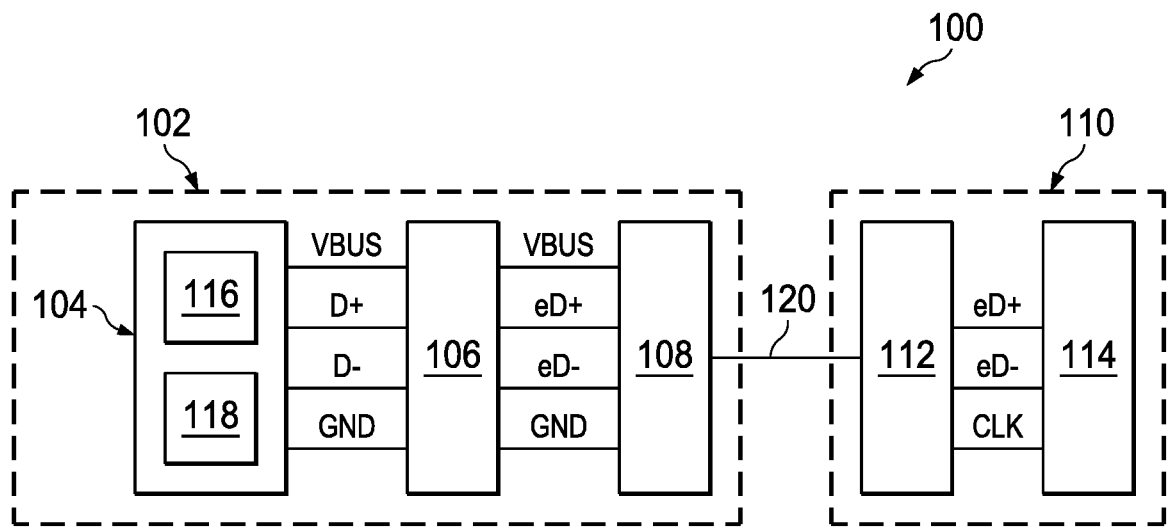
FIG. 1 shows a block diagram of an illustrative communication system in accordance with various examples.

Universal Serial Bus (USB) is a standard establishing specifications for interconnect cabling, connectors, and communication protocols. As referred to herein, USB refers to any version of the USB specification, including any amendments or supplements, certified by the USB Implementers Forum (USB IF) or any suitable body who replaces and/or aids the USB IF in its role overseeing the USB specification, whether now existing or later developed. In at least one example, USB, as referred to herein, encompasses any one or more of the USB 2.0 specification, USB 3.0 specification, USB 4.0 specification, or any derivatives thereof, such as amended or ".x" variations of the above specifications. Also, as referred to herein, legacy USB refers to USB 2.x. Embedded USB (eUSB), in at least some examples, refers to eUSB2.

At its inception, USB was primarily intended for implementation in specifying standards for connection and communication between personal computers and peripheral devices. However, as adoption of the USB standard has expanded and implementation in computing devices of support for the USB standard has gained in popularity, efforts have been made to extend and expand the applicability of USB. For example, while initially establishing specifications for communications between personal computers and peripheral devices, USB has expanded to communication between peripheral devices, between personal computers, and other use cases. Moreover, USB has developed into an efficient and high performance communication protocol that lends itself to use in unexpected applications, such as communications between components in automobiles, etc. As a result of such widespread implementation and use of USB, efforts are being further made to utilize USB as a communication protocol among individual subsystems or circuits (e.g., such as a system-on-a-chip (SoC)). Such implementations are sometimes referred to as eUSB2. New challenges arise in implementing eUSB2. For example, at a circuit level, computing devices often operate at voltage levels that vary from those of conventional USB, creating an impediment between direct communication between eUSB2 and legacy USB systems. To mitigate this impediment, an eUSB2 repeater operates as a bridge or non-linear re-driver between eUSB2 and legacy USB systems, or vice versa, to translate between legacy USB signaling voltage levels that are customarily about 3.3 volts (V) and eUSB2 signaling voltage levels that are circuit-level (e.g., silicon appropriate voltages) such as about 1.0 V, 1.2 V, 1.4 V, or any other suitable value less than 3.3 V.

Signaling lines in USB and/or eUSB2 systems are, in at least some examples, differential and bidirectional communication lines. The communication lines are, in some examples, half-duplex communication lines. In high-speed operation, at least some signaling lines in a USB system are differential. In other examples, such as in full-speed and low-speed operation, the signaling lines are not differential but instead toggle independently. Signaling lines over which signaling according to USB protocols occurs, whether differential or not, are referred to herein as D+ and D−. Signaling lines over which signaling according to eUSB2 protocols occurs, whether differential or not, are referred to herein as eD+ and eD−. Further, data communicated via eD+ and eD− is, in some examples, referred to as 2-line data. Similarly, data communicated via D+ and D− is, in some examples, referred to as 2-line data. In some applications it is advantageous, beneficial, or otherwise potentially desirable to have the data communication capabilities of USB and/or eUSB2 while lacking dual communication lines between devices that are communicating. For example, retaining the 2-line data signaling of USB and/or eUSB2 but transmitting that 2-line data via a single conductor or transmission line. Reducing a number of conductors coupling devices communicating according to USB and/or eUSB2, in at least some examples, reduces a cost of implementing USB in the devices. In at least some examples, such as in the automobile example mentioned above, reducing the number of conductors further has a cumulative effect of reducing weight. This reduction in weight lends itself to the realization of further system improvements stemming from the ability of the USB and/or eUSB2 devices to perform 2-line data signaling via a single conductor. In at least some examples, the 2-line data is modulated onto a power line coupling the USB and/or eUSB2 devices such that only one conductor is required to communicate the 2-line data between the USB and/or eUSB2 devices as opposed to a plurality of conductors.

At least some aspects of the present disclosure provide for transmission of 2-line data via a single line coupling a first device to a second device. In some examples, the single line is the only conductor coupling the first device to the second device. The single line is, in some examples, a power line over which a voltage is transmitted between the first device and the second device. By modulating a signal transmitted via the single line between the first device and the second device, 2-line data is communicated between the first device and the second device via the power line. In at least some examples, the modulated signal is transmitted according to a communication standard, such as a USB standard. For example, certain communication standards include timing, jitter, or other requirements for transmitted data to be considered compliant with the communication standard. In at least some examples, the modulated signal transmitted via the single line according to the present disclosure meets those timing requirements.

In at least some examples, the single line is modulated according to received 2-line data. For example, the single line is modulated to include a single pulse to toggle a data bit of one type and include two pulses to toggle a data bit of another type. As a more specific example of one implementation of the present disclosure, a single pulse indicates a change in state (e.g., rising edge or falling edge) of eD+ and two pulses indicate a change in state (e.g., rising edge or falling edge) of eD−. Similarly, in other examples, the single line is modulated to include any other number of pulses to toggle a data bit of yet another type. In yet other examples, other waveform types beyond pulses (e.g., square waves) are used in modulating the 2-line data onto the single line. For example, in at least some examples, the 2-line data is modulated onto the single line using sine waves. In at least some implementations, additional data is modulated onto the single line after modulating the 2-line data onto the single line. For example, in some implementations, data compliant with Universal Asynchronous Receiver/Transmitter (UART) communication is modulated onto the single line after modulating the 2-line data onto the single line.

In at least some examples, the single line is a half-duplex communication line between the first device and the second device. In at least some implementations, each of the first device and the second device includes, or is configured to couple to, a repeater that includes an encoder and a decoder. The encoder receives eD+ and eD− and encodes eD+ and eD− onto the power line as a modulated signal. The decoder receives a modulated or encoded signal and a clock signal and decodes the modulated signal to reconstruct eD+ and eD− on a bit-by-bit basis. In at least some examples, the encoder and the decoder each include a plurality of logic circuits, such as circuits capable of performing logical operations, and/or d flip-flops.

Turning now to FIG. 1, a block diagram of an illustrative communication system 100 is shown. In at least some examples, the system 100 represents a USB system. In some examples, the system 100 includes a device 102 that includes USB host device 104, a USB to eUSB2 repeater 106, and an eUSB2 to power line (e2pwr) repeater 108. The system 100 further includes a device 110 that includes at least an e2pwr repeater 112 and a processor 114. In at least some examples, the device 110 is a device that operates at signal levels specified according to eUSB2. In other examples, the device 110 receives signals having levels specified according to eUSB2 and converts those signals to other signal levels, such as those specified by USB or other communication protocols. Generally, the system 100 is illustrative of any system that implements devices that communicate according to a USB protocol. In at least some examples, the USB host device 104 is a legacy USB device, as described elsewhere herein. In some examples, one or both of the eUSB2 repeater 106 or the e2pwr repeater 108 is implemented external to the device 102 and configured to couple to the device 102 through an appropriate interface (e.g., such as a port and receptacle suitable for performing communication according to eUSB2 or USB protocol).

The eUSB2 repeater 106 communicatively couples the USB host device 104 to the device 110 via at least the e2pwr repeater 108 and the e2pwr repeater 112. In at least some examples, the eUSB2 repeater 106 converts signals appropriate for the USB host device 104 to signals compliant with eUSB2 specifications, and vice versa. For example, in some implementations signaling compliant with eUSB2, such as in the e2pwr repeater 108, is performed in a range of about 0.8 V to about 1.4 V. Similarly, in some implementations signaling in the USB host device 104 is performed at about 3.3 V. In at least some examples, the eUSB2 repeater 106 operates as a bit-level repeater, receiving signals from one of the USB host device 104 or e2pwr repeater 108 and converting the signals for use by the other of the USB host device 104 or e2pwr repeater 108 (e.g., by shifting a voltage level of the signals upward or downward based on a direction of the communications).

In at least some examples, the TX 116 transmits data according to USB protocols or standards as D+ and/or D−, which are received by the eUSB2 repeater 106. The RX 118 receives data according to USB protocols or standards via D+ and/or D−, which are transmitted by the eUSB2 repeater 106. The USB host device 104 and the eUSB2 repeater 106, as well as, in some examples, the eUSB2 repeater 106 and the e2pwr repeater 108, are further coupled together by a bus voltage signal line (VBUS) and a ground signal line (GND). The eUSB2 repeater 106 receives D+ and/or D− transmitted according to USB protocol from the TX 116 and converts D+ and/or D− to eUSB2 protocol as eD+ and/or eD− before transmitting eD+ and/or eD− in the eUSB2 protocol to the e2pwr repeater 108. Similarly, the eUSB2 repeater 106 receives eD+ and/or eD− transmitted according to eUSB2 protocol from the e2pwr repeater 108 and converts eD+ and/or eD− to USB protocol before transmitting as D+ and/or D− in the USB protocol to the RX 118.

The e2pwr repeater 108 receives eD+ and/or eD− from the eUSB2 repeater 106 and modulates eD+ and/or eD− onto a single data transmission line 120 coupling the device 102 to the device 110. In at least some examples, the transmission line 120 is a power line through which one of the device 102 or the device 110 receives a power signal from the other of the device 102 or the device 110. In other examples, the transmission line 120 is a singular data transmission line coupling the device 102 and the device 110 but over which power is not transferred between the device 102 and the device 110. In at least some examples, although not shown, other signal lines such as a VBUS signal line are additionally coupled between the device 102 and the device 110. In at least some examples, the e2pwr repeater 108 receives eD+ and/or eD− from the eUSB2 repeater 106 and encodes eD+ and/or eD− onto the transmission line 120. For example, the e2pwr repeater 108 modulates a signal present on the transmission line 120 to include one or more pulses or other signal waveforms to indicate a change in state (e.g., rising edge or falling edge) in a data bit of eD+ and/or eD−.

To indicate a change in state of a data bit of eD+, in some implementations, the e2pwr repeater 108 encodes the transmission line 120 to include a square wave pulse. In at least some examples, the pulse has a pulse width of about 10 nanoseconds (ns). In other examples, the pulse has a pulse width of any suitable amount of time determined according to a communication protocol or standard implemented by the system 100. In other examples, to indicate the change in state of eD+, the e2pwr repeater 108 encodes the transmission line 120 to include a sine wave. Similarly, to indicate a change in state of eD−, in some implementations, the e2pwr repeater 108 encodes the transmission line 120 to include two square wave pulses. In at least some examples, each pulse has a pulse width of about 10 ns and the pair of pulses is separated by about 10 ns. In other examples, the pulses each have pulse widths of any suitable amount of time determined according to a communication protocol or standard implemented by the system 100. In some examples, the pulses have a same pulse width and in other examples one of the pair of pulses has a different pulse width than the other of the pair of pulses. When at least some pulses have different widths, in some examples, each state change is encoded as a single pulse of a unique width to indicate different data types as opposed to multiple pulses to indicate different data types.

The e2pwr repeater 112, in at least some examples, receives the pulses via the transmission line 120 that were generated by the e2pwr repeater 108. The e2pwr repeater 112 decodes the pulses to reconstruct eD+ and/or eD− complying with eUSB2 signaling protocols. In at least some examples, the e2pwr repeater 112 further receives a clock signal (CLK) from the processor 114. CLK, in at least some examples, matches a frequency of operation or different clock signal utilized in the device 102 in generating the eD+ and/or eD−. In at least some examples, CLK enables the e2pwr repeater 112 to accurately detect and reconstruct eD+ and/or eD− as modulated onto the transmission line 120 by the e2pwr repeater 108. After reconstructing eD+ and/or eD−, in at least some examples, the e2pwr repeater 112 provides eD+ and/or eD− to the processor 114, or another component (not shown) of the device 110. In at least some examples, the another component is a repeater that alters a signal level of eD+ and/or eD− (such as to recreate D+ and/or D−).

In at least some examples, the processor 114 further provides second eD+ and/or eD− to the e2pwr repeater 112. The e2pwr repeater 112 encodes the second eD+ and/or eD− onto the transmission line 120 in a manner substantially similar to that described above with respect to the e2pwr repeater 108 and which is not repeated herein. The e2pwr repeater 108 then decodes the eD+ and/or eD− from the pulses present on the transmission line 120 in a manner substantially similar to that described above with respect to the e2pwr repeater 112 and which is not repeated herein.

Figure 2:
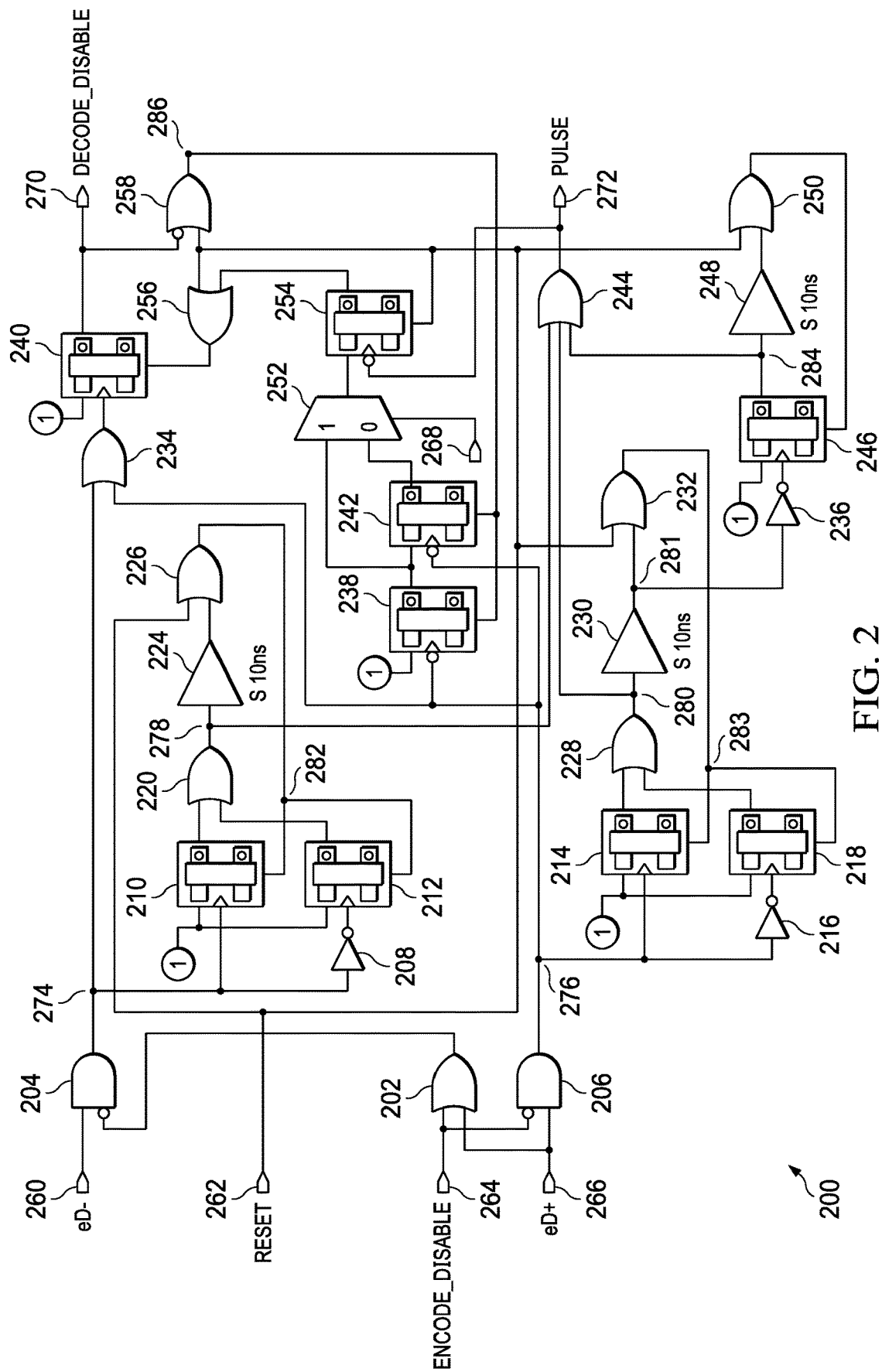
FIG. 2 shows a schematic diagram of an illustrative encoder in accordance with various examples.

Turning now to FIG. 2, a schematic diagram of an illustrative encoder 200 is shown. In at least some examples, the encoder 200 is suitable for implementation in an e2pwr repeater, such as the e2pwr repeater 108 and/or the e2pwr repeater 112 of the system 100 of FIG. 1. The encoder 200, in at least some examples, is configured to receive eD+ and/or eD− and encode eD+ and/or eD− into a single transmission signal suitable for transmission on a single transmission line.

The encoder 200, in some examples, encodes eD+ and/or eD− into the single transmission signal by encoding the single transmission signal with symbols indicating changes in state of various data types included in the single transmission signal. For example, a first symbol indicates a change in state of a first data type, such as a change in state of eD+. A second symbol indicates a change in state of a second data type, such as a change in state of eD−. Although not shown in the encoder 200, in at least some examples, the encoder 200 is modifiable such that a third symbol indicates a change in state of a third data type. In this way, the encoder 200 is capable of encoding the single transmission signal with multiple types of data based on unique symbols that indicate changes in state of each of the types of data.

In at least one example, the encoder 200 includes a plurality of logic structures such as AND logic circuits, OR logic circuits, inverting circuits, delay circuits, and data flip-flops (d flip-flops). In at least some examples, a delay circuit is any circuit or component capable of causing a delay (predetermined and/or programmable) in a signal path. Numerous types of delay circuits are suitable for implementation in the present disclosure and a scope of these suitable delay circuits is not limited herein. For example, at least one implementation of the encoder 200 includes an OR logic circuit 202, an AND logic circuit 204, an AND logic circuit 206, a inverting circuit 208, a d flip-flop 210, a d flip-flop 212, a d flip-flop 214, an inverting circuit 216, a d flip-flop 218, an OR logic circuit 220, and a delay circuit 224. The encoder 200 further includes an OR logic circuit 226, an OR logic circuit 228, a delay circuit 230, an OR logic circuit 232, an OR logic circuit 234, an inverting circuit 236, a d flip-flop 238, a d flip-flop 240, a d flip-flop 242, an OR logic circuit 244, a d flip-flop 246, a delay circuit 248, an OR logic circuit 250, a multiplexer 252, a d flip-flop 254, an OR logic circuit 256, and an OR logic circuit 258.

In an example architecture of the encoder 200, the OR logic circuit 202 has a first input terminal coupled to a node 264, a second input terminal coupled to a node 266, and an output terminal. The AND logic circuit 204 has an input terminal coupled to a node 260, an inverting input terminal coupled to the output terminal of the OR logic circuit 202, and an output terminal coupled to a node 274. As used herein, an inverting input terminal, or an inverting output terminal, is a terminal at which a value of a signal is inverter between the device to which the terminal belongs and a node to which the terminal couples. An inverting input terminal or an inverting output terminal, in at least some examples, is functionally equivalent to coupling an inverting circuit between a node to which the inverting terminal couples and a non-inverting input terminal of the device to which the inverting input terminal belongs. The AND logic circuit 206 has an inverting input terminal coupled to the node 264, an input terminal coupled to the node 266, and an output terminal coupled to a node 276. The inverting circuit 208 has an input terminal coupled to the node 274 and an output terminal. The d flip-flop 210 has a data input terminal configured to receive a logical high value, a clock input terminal coupled to the node 274, a reset input terminal, and an output terminal. The d flip-flop 212 has a data input terminal configured to receive a logical high value, a clock input terminal coupled to the output terminal of the inverting circuit 208, a reset input terminal coupled to a node 282, and an output terminal. The d flip-flop 214 has a data input terminal configured to receive a logical high value, a clock input terminal coupled to the node 276, a reset input terminal coupled to a node 283, and an output terminal. The inverting circuit 216 has an input terminal coupled to the node 276 and an output terminal.

The d flip-flop 218 has a data input terminal configured to receive a logical high value, a clock input terminal coupled to the output terminal of the inverting circuit 216, a reset input terminal coupled to the node 283, and an output terminal. The OR logic circuit 220 has a first input terminal coupled to the output terminal of the d flip-flop 210, a second input terminal coupled to the output terminal of the d flip-flop 212, and an output terminal coupled to a node 278. The delay circuit 224 has an input terminal coupled to the node 278 and an output terminal. The OR logic circuit 226 has a first input terminal coupled to the node 262, a second input terminal coupled to the output terminal of the delay circuit 224, and an output terminal coupled to the node 282. The OR logic circuit 228 has a first input terminal coupled to the output terminal of the d flip-flop 214, a second input terminal coupled to the output terminal of the d flip-flop 218, and an output terminal coupled to a node 280.

The delay circuit 230 has an input terminal coupled to the node 280 and an output terminal coupled to a node 281. The OR logic circuit 232 has a first input terminal coupled to the node 262, a second input terminal coupled to the node 281, and an output terminal coupled to the node 283. The OR logic circuit 234 has a first input terminal coupled to the node 274, a second input terminal coupled to the node 276, and an output terminal. The inverting circuit 236 has an input terminal coupled to the node 281 and an output terminal. The d flip-flop 238 has a data input terminal configured to receive a logical high value, an inverted clock input terminal coupled to the node 276, a reset input terminal coupled to a node 286, and an output terminal. The d flip-flop 240 has a data input terminal configured to receive a logical high value, a clock input terminal coupled to the output terminal of the OR logic circuit 234, a reset input terminal, and an output terminal coupled to a node 270. The d flip-flop 242 has a data input terminal coupled to the output terminal of the d flip-flop 238, an inverted clock input terminal coupled to the node 276, a reset input terminal coupled to the node 286, and an output terminal.

The OR logic circuit 244 has a first input terminal coupled to the node 278, a second input terminal coupled to the node 280, a third input terminal coupled to a node 284, and an output terminal coupled to a node 272. The d flip-flop 246 has a data input terminal configured to receive a logical high value, a clock input terminal coupled to the output terminal of the inverting circuit 236, a reset input terminal, and an output terminal coupled to the node 284. The delay circuit 248 has an input terminal coupled to the node 284 and an output terminal. The OR logic circuit 250 has a first input terminal coupled to the node 262, a second input terminal coupled to the output terminal of the delay circuit 248, and an output terminal coupled to the reset input terminal of the d flip-flop 246. The multiplexer 252 has a first input terminal coupled to the output terminal of the d flip-flop 238, a second input terminal coupled to the output terminal of the d flip-flop 242, a select input terminal coupled to a node 268, and an output terminal.

The d flip-flop 254 has a data input terminal coupled to the output terminal of the multiplexer 252, an inverted clock input terminal coupled to the node 272, a reset input terminal coupled to the node 262, and an output terminal. The OR logic circuit 256 has a first input terminal coupled to the output terminal of the d flip-flop 254, a second input terminal coupled to the node 262, and an output terminal coupled to the reset input terminal of the d flip-flop 240. The OR logic circuit 258 has an inverting input terminal coupled to the node 270, an input terminal coupled to the node 262, and an output terminal coupled to the node 286.

In at least some examples, the encoder 200 is configured to receive eD+ at the node 260 and receive eD− at the node 266. The encoder 200 is further configured to receive a reset signal (RESET) at the node 262, and an encoder disable signal (ENCODER_DISABLE) at the node 264. The encoder 200 is further configured to receive a multiplexer selection signal at the node 268. In at least one example, the multiplexer selection signal indicates a source of a data packet being received by the encoder 200 (e.g., at the node 260 and/or the node 266). In at least some examples, the encoder 200 is configured to output an encoded signal (PULSE) at the node 272. The encoder 200 is further configured to output a decoder disable signal (DECODER_DISABLE) at the node 270. In at least some examples, when the encoder 200 is encoding data present at the node 260 and/or the node 266 to generate PULSE at the node 272, DECODER_DISABLE has a value configured to disable a decoder receiving DECODER_DISABLE from decoding PULSE.

In an example of operation of the encoder 200, data is received at the node 260 and/or the node 266 and encoded to the node 272. The encoding is performed, in at least some examples, when ENCODER_DISABLE is de-asserted, indicating that data on a transmission line coupled to the node 272 is not being decoded by a decoder in a device that also includes the encoder 200. In at least some examples, for each rising edge received at the node 260 and each falling edge received at the node 260, the encoder 200 toggles PULSE. In at least one example, PULSE includes a square wave pulse having a pulse width, or duration, of about 10 ns to indicate a received rising or falling edge at the node 260. Similarly, for each rising edge received at the node 266 and each falling edge received at the node 266, the encoder 200 further toggles PULSE. In at least one example, the signal is two square wave pulses, each having a pulse width or duration of about 10 ns, separated in time by about 10 ns to indicate a received rising or falling edge at the node 266. In this way, PULSE is encoded with the data received at the node 260 and the node 266.

Figure 3:
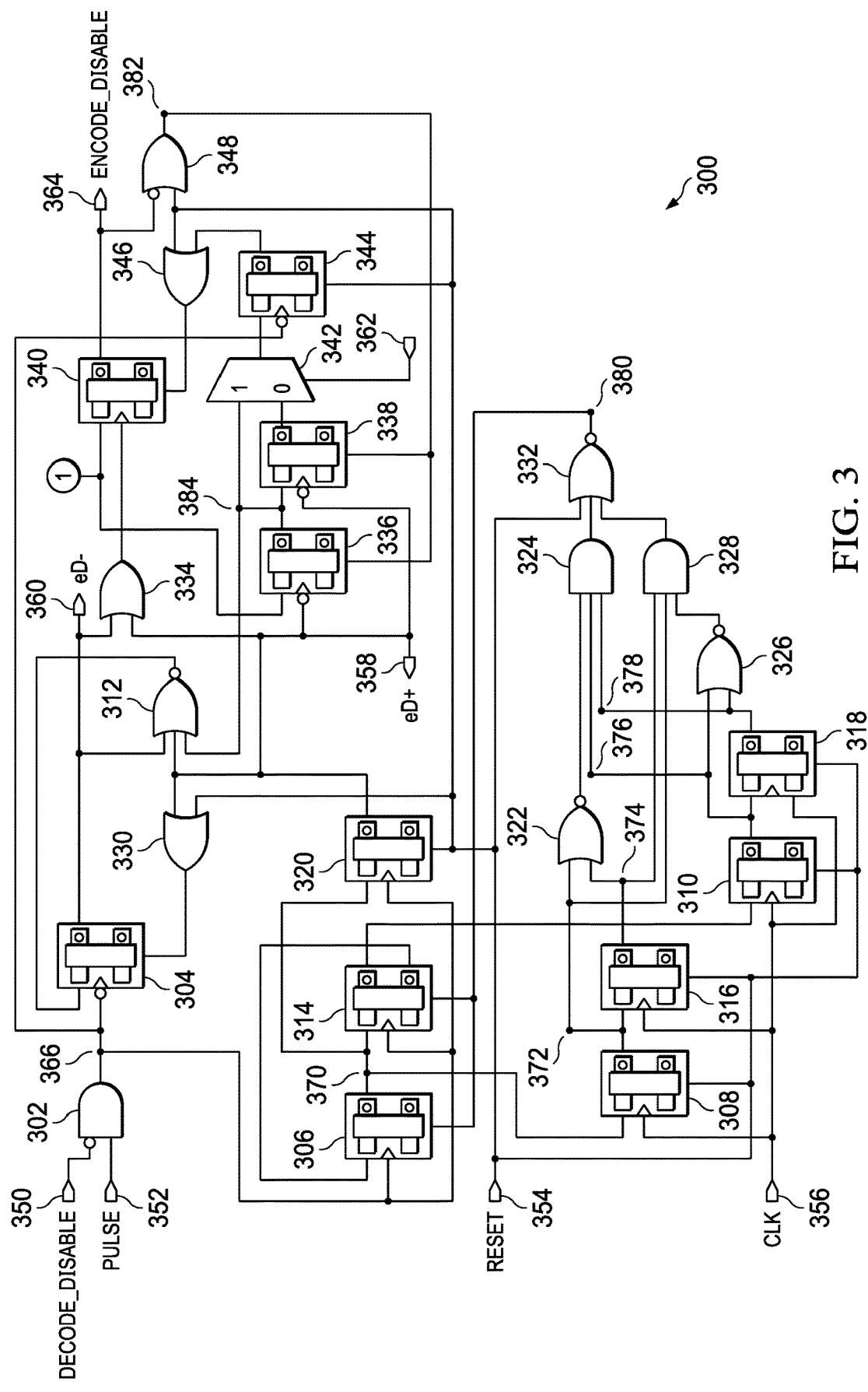
FIG. 3 shows a schematic diagram of an illustrative decoder in accordance with various examples.

Turning now to FIG. 3, a schematic diagram of an illustrative decoder 300 is shown. In at least some examples, the decoder 300 is suitable for implementation in an e2pwr repeater, such as the e2pwr repeater 108 and/or the e2pwr repeater 112 of the system 100 of FIG. 1. The decoder 300, in at least some examples, is configured to receive PULSE on a single transmission line and decode the PULSE into eD+ and/or eD−. In at least some examples, the decoder 300 is configured to be implemented in a same device as the encoder 200 of FIG. 2, for example, such that the encoder 200 and the decoder 300 are coupled together and/or coupled to a same single transmission line.

The decoder 300, in some examples, decodes PULSE to generate eD+ and/or eD− by detecting and decoding symbols indicating changes in state of various data types included in PULSE. In at least some examples, the symbols are as described above with respect to the encoder 200.

In at least one example, the decoder 300 includes a plurality of logic structures such as AND logic circuits, OR logic circuits, inverting OR logic circuits, inverting circuits, and d flip-flops. For example, at least one implementation of the decoder 300 includes an AND logic circuit 302, a d flip-flop 304, a d flip-flop 306, a d flip-flop 308, a d flip-flop 310, an inverting OR logic circuit 312, a d flip-flop 314, a d flip-flop 316, a d flip-flop 318, a d flip-flop 320, an inverting OR logic circuit 322, an AND logic circuit 324, an inverting OR circuit 326, an AND logic circuit 328, an OR logic circuit 330, an OR logic circuit 332, an OR logic circuit 334, a d flip-flop 336, a d flip-flop 338, a d flip-flop 340, a multiplexer 342, a d flip-flop 344, an OR logic circuit 346, and an OR logic circuit 348.

In an example architecture of the decoder 300, the AND logic circuit 302 has an inverting input terminal coupled to a node 350, an input terminal coupled to a node 352, and an output terminal coupled to a node 366. The d flip-flop 304 has a data input terminal, an inverted clock input terminal coupled to the node 366, a reset input terminal, and an output terminal coupled to a node 360. The d flip-flop 306 has a data input terminal, a clock input terminal coupled to the node 366, a reset input terminal coupled to a node 380, and an output terminal coupled to a node 370. The d flip-flop 308 has a data input terminal coupled to the node 370, a clock input terminal coupled to a node 356, a reset input terminal coupled to a node 354, and an output terminal coupled to a node 372. The d flip-flop 310 has a data input terminal, a clock input terminal coupled to the node 356, a reset input terminal coupled to the node 354, and an output terminal coupled to a node 376. The inverting OR logic circuit 312 has a first input terminal coupled to the node 360, a second input terminal coupled to a node 358, a third input terminal coupled to a node 384, and an output terminal coupled to the data input terminal of the d flip-flop 304.

The d flip-flop 314 has a data input terminal coupled to the node 370, a clock input terminal coupled to the node 366, a reset input terminal coupled to the node 380, an output terminal coupled to the data input terminal of the d flip-flop 310, and an inverted output terminal coupled to the data input terminal of the d flip-flop 306. The d flip-flop 316 has a data input terminal coupled to the node 372, a clock input terminal coupled to the node 356, a reset input terminal coupled to the node 354, and an output terminal coupled to the node 374. The d flip-flop 318 has a data input terminal coupled to the node 376, a clock input terminal coupled to the node 356, a reset input terminal coupled to the node 354, and an output terminal coupled to a node 378. The d flip-flop 320 has a data input terminal coupled to the node 370, a clock input terminal coupled to the node 366, a reset input terminal coupled to the node 354, and an output terminal coupled to the node 358.

The inverting OR logic circuit 322 has a first input terminal coupled to the node 372, a second input terminal coupled to the node 374, and an inverted output terminal. The AND logic circuit 324 has a first input terminal coupled to the inverted output terminal of the inverting OR logic circuit 322, a second input terminal coupled to the node 376, a third input terminal coupled to the node 378, and an output terminal. The inverting OR logic circuit 326 has a first input terminal coupled to the node 376, a second input terminal coupled to the node 378, and an inverted output terminal. The AND logic circuit 328 has a first input terminal coupled to the node 374, a second input terminal coupled to the node 372, a third input terminal coupled to the inverted output terminal of the inverting OR logic circuit 326, and an output terminal.

The OR logic circuit 330 has a first input terminal coupled to the node 358, a second input terminal coupled to the node 354, and an output terminal coupled to the reset input terminal of the d flip-flop 304. The OR logic circuit 332 has a first input terminal coupled to the node 354, a second input terminal coupled to the output terminal of the AND logic circuit 324, and a third input terminal coupled to the output terminal of the AND logic circuit 328. The OR logic circuit 332 further has an output terminal coupled to the reset input terminal of the d flip-flop 320, the reset input terminal of the d flip-flop 314, and the reset input terminal of the d flip-flop 306. The OR logic circuit 334 has a first input terminal coupled to the node 360, a second input terminal coupled to the node 358, and an output terminal.

The d flip-flop 336 has a data input terminal configured to receive a logical high value, an inverted clock input terminal coupled to the node 358, a reset input terminal coupled to a node 382, and an output terminal coupled to a node 384. The d flip-flop 338 has a data input terminal coupled to the node 384, an inverted clock input terminal coupled to the node 358, a reset input terminal coupled to the node 382, and an output terminal. The d flip-flop 340 has a data input terminal configured to receive a logical high value, a clock input terminal coupled to the output terminal of the OR logic circuit 334, a reset input terminal, and an output terminal coupled to the node 364. The multiplexer 342 has a first input terminal coupled to the node 384, a second input terminal coupled to the output terminal of the d flip-flop 338, a select input terminal coupled to a node 362, and an output terminal.

The d flip-flop 344 has a data input terminal coupled to the output terminal of the multiplexer 342, an inverted clock input terminal coupled to the node 366, a reset input terminal coupled to the node 354, and an output terminal. The OR logic circuit 346 has a first input terminal coupled to the output terminal of the d flip-flop 344, a second input terminal coupled to the node 354, and an output terminal coupled to the reset input terminal of the d flip-flop 340. The OR logic circuit 348 has an input terminal coupled to the node 354, an inverting input terminal coupled to the node 364, and an output terminal coupled to the node 382.

In at least some examples, the decoder 300 is configured to receive PULSE at the node 352, output eD+ at the node 358, and output eD− at the node 360. The decoder 300 is further configured to receive RESET at the node 354, and DECODER_DISABLE at the node 350. The decoder 300 is further configured to receive a multiplexer selection signal at the node 362. In at least one example, the multiplexer selection signal indicates a source of a data packet being received by the decoder 300 (e.g., at the node 352). The decoder 300 is further configured to output ENCODER_DISABLE at the node 364. In at least some examples, when the decoder 300 is decoding PULSE to generate eD+ and/or eD−, ENCODER_DISABLE has a value configured to disable an encoder receiving ENCODER_DISABLE from encoding eD+ and/or eD−.

In at least one example, the node 364 of the decoder 300 is coupled to the node 264 of the encoder 200. Similarly, the node 350 of the decoder 300 is coupled to the node 270 of the encoder 200. Similarly, in at least some examples, the node 352 and the node 272 of the encoder 200 are coupled together, the node 358 and the node 266 of the encoder 200 are coupled together, and the node 360 and the node 260 of the encoder 200 are coupled together.

In an example of operation of the decoder 300, encoded data in the form of PULSE is received at the node 352. The decoding is performed, in at least some examples, when DECODER_DISABLE signal is de-asserted, indicating that data on a transmission line coupled to the node 352 is not being encoded by an encoder in a device that also includes the decoder 300. In at least some examples, the decoder 300 detects symbols present in PULSE at the node 352 and processes those symbols to generate eD+ at the node 358 and eD− at the node 360. For example, for each rising edge detected at the node 352, a state change occurs in a signal generated at the node 358 or the node 360. For example, when a symbol including two rising edges (e.g., a symbol including two signal pulses) is received at the node 352, the decoder 300 toggles the signal at the node 358. For example, if the signal at the node 358 is de-asserted when symbol including two rising edges is received at the node 352, in response to such receipt the decoder 300 asserts the signal at the node 358 and vice versa. Similarly, when a symbol including one rising edge (e.g., a symbol including one signal pulse) is received at the node 352, the decoder 300 toggles a signal at the node 360. For example, if the signal at the node 360 is de-asserted when symbol including one rising edge is received at the node 352, in response to such receipt the decoder 300 asserts the signal at the node 360 and vice versa. In this way, the signal present at the node 352 is decoded to generate 2-line data at the node 358 and the node 360.

Figure 4:
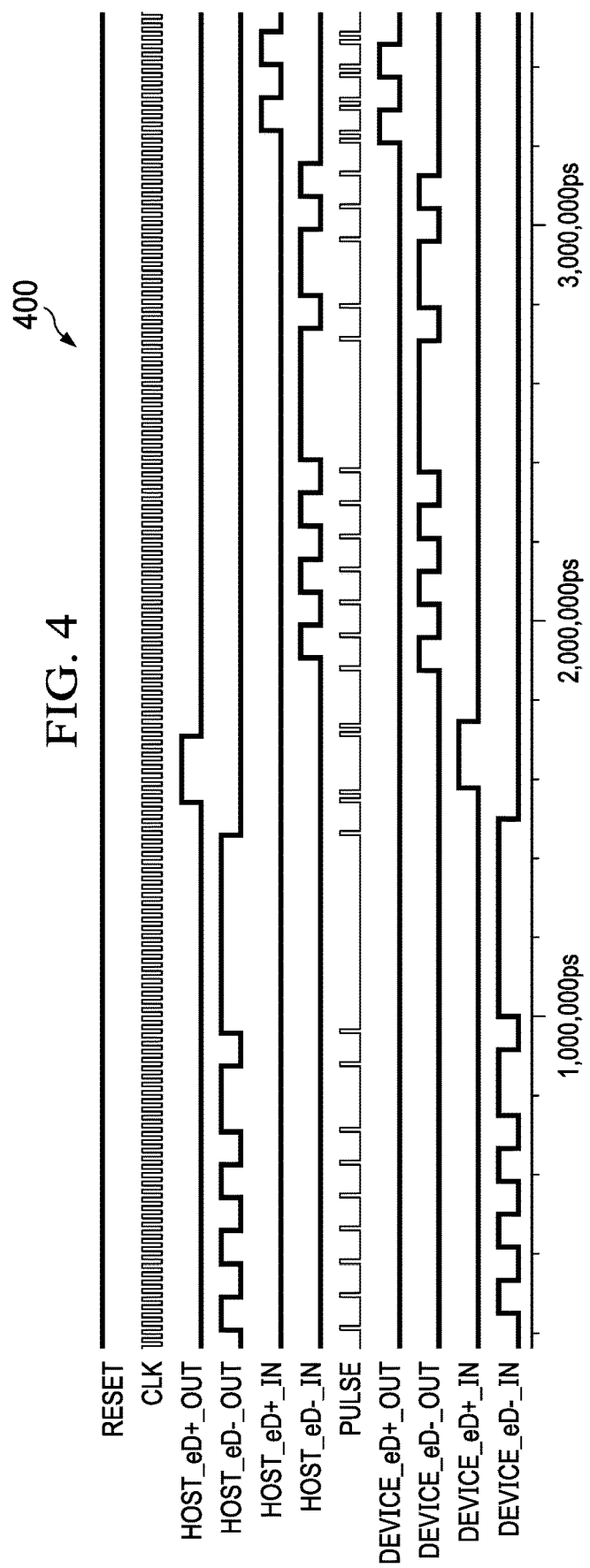
FIG. 4 shows an illustrative timing diagram in accordance with various examples.

Turning now to FIG. 4, an illustrative timing diagram 400 of e2pwr data transmissions is shown. The diagram 400 is illustrative of at least some signals present in the system 100 of FIG. 1, signals generated by the encoder 200 of FIG. 2, and/or signals generated by the decoder 300 of FIG. 3, and reference is made in describing the diagram 400 to at least some of FIG. 1, FIG. 2, and/or FIG. 3. The diagram 400 includes signals RESET, CLK, HOST_eD+_OUT, HOST_eD−_OUT, HOST_eD+_IN, HOST_eD−_IN, PULSE, DEVICE_eD+_OUT, DEVICE_eD−_OUT, DEVICE_eD+_IN, and DEVICE_eD−_IN. HOST_eD+_OUT and HOST_eD−_OUT are, in some examples, signals output by the eUSB2 repeater 106 to the e2pwr repeater 108. Accordingly, in some examples, HOST_eD+_OUT and HOST_eD−_OUT respectively correspond to eD+ and eD− of FIG. 2 (when FIG. 2 is representative of a component of the e2pwr repeater 108). HOST_eD+_IN and HOST_eD−_IN are, in some examples, signals output by the e2pwr repeater 108 to the eUSB2 repeater 106. Accordingly, in some examples, HOST_eD+_IN and HOST_eD−_IN respectively correspond to eD+ and eD− of FIG. 3 (when FIG. 2 is representative of a component of the e2pwr repeater 108). DEVICE_eD+_IN and DEVICE_eD−_IN are, in some examples, signals output by the e2pwr repeater 112 to the processor 114. Accordingly, in some examples, DEVICE_eD+_IN and DEVICE_eD−_IN respectively correspond to eD+ and eD− of FIG. 3 (when FIG. 3 is representative of a component of the e2pwr repeater 112). DEVICE_eD+_OUT and DEVICE_eD−_OUT are, in some examples, signals output by the processor 114 to the e2pwr repeater 112. Accordingly, in some examples, DEVICE_eD+_OUT and DEVICE_eD−_OUT respectively correspond to eD+ and eD− of FIG. 2 (when FIG. 2 is representative of a component of the e2pwr repeater 112). PULSE is, in some examples, the signal transmitted between the e2pwr repeater 108 and the e2pwr repeater 112 and corresponds to both FIG. 2 and FIG. 3.

As illustrated by the diagram 400, for each rising edge or falling edge of HOST_eD+_OUT and DEVICE_eD+_OUT, PULSE is encoded with a signal pulse having a width of approximately 10 ns. Similarly, for each rising edge or falling edge of HOST_eD−_OUT and DEVICE_eD−_OUT, PULSE is encoded with a pair of signal pulses each having widths of approximately 10 ns, separated by about 10 ns. Similarly, when PULSE includes pulses encoded according to HOST_eD+_OUT or HOST_eD−_OUT, corresponding signals DEVICE_eD+_IN and DEVICE_eD−_IN are generated by decoding PULSE. When PULSE includes pulses encoded according to DEVICE_eD+_OUT or DEVICE_eD−_OUT, corresponding signals HOST_eD+_IN and HOST_eD−_IN are generated by decoding PULSE.

Figure 5:
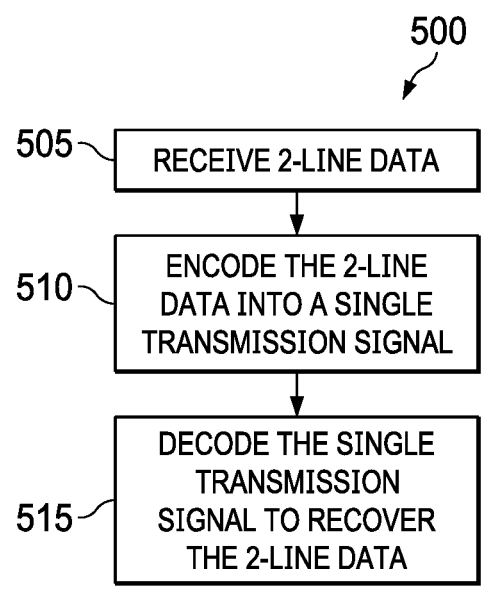
FIG. 5 shows a flowchart of an illustrative method in accordance with various examples.

Turning now to FIG. 5, a flowchart of an illustrative method 500 is shown. In at least some examples, the method 500 is a method of data transmission in a USB system. The method 500 is implemented, in some examples, by the system 100 of FIG. 1. Further, in at least some examples, at least a portion of the method 500 is implemented by the encoder 200 of FIG. 2 and/or the decoder 300 of FIG. 3.

At operation 505, 2-line data is received. The 2-line data is received, in some examples, as eD+ and eD−. In other examples, the 2-line data is differential data.

At operation 510, the 2-line data is encoded into a single transmission signal. In at least some examples, the 2-line data is encoded into the single transmission signal by generating a plurality of pulses on the single transmission signal. Each group of pulses is, in some examples, referred to as a symbol. For example, for a rising edge in a first component of the 2-line data, the single transmission line is encoded with a signal pulse. Similarly, for a falling edge in the first component of the 2-line data, the single transmission line is encoded with another signal pulse. Each signal pulse is, in some examples, about 10 ns in duration. For a rising edge in a second component of the 2-line data, the single transmission line is encoded with a pair of pulses. Similarly, for a falling edge in the second component of the 2-line data, the single transmission line is encoded with another pair of signal pulses. Each signal pulse is, in some examples, about 10 ns in duration and the signal pulses of the pair are separated by about 10 ns.

At operation 515, the single transmission signal is decoded to recover the 2-line data. In at least some examples, each symbol in the single transmission signal corresponds to a change in state in a component of the 2-line data. For example, for a symbol including two signal pulses, the single transmission signal is decoded to toggle a signal in one component of the 2-line data. Similarly, for a symbol including one signal pulse, the single transmission signal is decoded to toggle a signal in the other component of the 2-line data.

In at least some examples, the operation 505 and the operation 510 are performed by one device and the operation 515 is performed by another device. For example, in some implementations, the operation 505 and the operation 510 are performed by the e2pwr repeater 108 when transmitting data to the e2pwr repeater 112 and the e2pwr repeater 112 performs operation 515 after receiving data from the e2pwr repeater 108. Similarly, in some implementations the operation 505 and the operation 510 are performed by the e2pwr repeater 112 when transmitting data to the e2pwr repeater 108 and the e2pwr repeater 108 performs operation 515 after receiving data from the e2pwr repeater 112. Additionally, while the method 500 is discussed with reference to signal pulses, in other implementations other types of signals are used. For example, in some implementations the 2-line data is encoded into the single transmission signal according to a plurality of sine waves.

While the operations of the method 300 have been discussed and labeled with numerical reference, in various examples the method 300 includes additional operations that are not recited herein. In some examples any one or more of the operations recited herein include one or more sub-operations (e.g., such as intermediary comparisons, logical operations, output selections such as via a multiplexer, format conversions, determinations, etc.). In some examples any one or more of the operations recited herein is omitted.

In some examples any one or more of the operations recited herein is performed in an order other than that presented herein (e.g., in a reverse order, substantially simultaneously, overlapping, etc.). Each of these alternatives is intended to fall within the scope of the present disclosure.

In the foregoing discussion, the terms "including" and "comprising" are used in an open-ended fashion, and thus should be interpreted to mean "including, but not limited to . . . ." The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure either at a time of manufacture or after a time of manufacture, for example, by an end-user and/or a third-party.

While certain components are described herein as being of a particular process technology (e.g., field effect transistor (FET), metal oxide semiconductor FET (MOSFET), n-type, p-type, etc.), these components may be exchanged for components of other process technologies (e.g., replace FET and/or MOSFET with bi-polar junction transistor (BJT), replace n-type with p-type or vice versa, etc.) and reconfiguring circuits including the replaced components to provide desired functionality at least partially similar to functionality available prior to the component replacement. Components illustrated as resistors, unless otherwise stated, are generally representative of any one or more elements coupled in series and/or parallel to provide an amount of impedance represented by the illustrated resistor. Additionally, uses of the phrase "ground voltage potential" in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about", "approximately", or "substantially" preceding a value means+/−10 percent of the stated value.

The above discussion is meant to be illustrative of the principles and various examples of the present disclosure. Numerous variations and modifications will become apparent to those skilled in the art once the above disclosure is fully appreciated. It is intended that the present disclosure be interpreted to embrace all such variations and modifications.

What is claimed is:

1. A circuit, comprising:
   a Universal Serial Bus (USB) device configured to output 2-line data in a USB format;
   an embedded USB (eUSB2) repeater coupled to the USB device and configured to convert the 2-line data in the USB format to 2-line data in an eUSB2 format; and
   an eUSB2 to power line (e2pwr) repeater coupled to the eUSB2 repeater and configured to encode the 2-line data into a single transmission signal;
   wherein the e2pwr repeater encodes the 2-line data into the single transmission signal by generating a sine wave in the single transmission signal having a peak value at each state change of the 2-line data.

2. The circuit of claim 1, wherein the single transmission signal is a power signal.

3. The circuit of claim 1, wherein the e2pwr repeater is further configured to receive a second single transmission signal encoded with second 2-line data and decode the second single transmission signal to recover the second 2-line data from the second single transmission signal.

4. A system, comprising:
   a host device comprising:
      a Universal Serial Bus (USB) device configured to communicate 2-line data in a USB format;
      an embedded USB (eUSB) repeater coupled to the USB device and configured to convert the 2-line data between the USB format and an eUSB2 format; and
      an eUSB2 to power line (e2pwr) repeater coupled to the eUSB2 repeater and configured to encode the 2-line data into a single transmission signal; and
   a device comprising a second e2pwr repeater configured to receive the single transmission signal and decode the single transmission signal to recover the 2-line data in the eUSB2 format;
   wherein the single transmission signal is a power signal including a bus voltage and encoded with the 2-line data, and wherein the e2pwr repeater is coupled to the second e2pwr repeater via a transmission line over which the power signal encoded with the 2-line data is transmitted.

5. The system of claim 4, wherein the e2pwr repeater encodes the 2-line data into the single transmission signal by generating a signal pulse in the single transmission signal at each state change of the 2-line data.

6. The system of claim 4, wherein the e2pwr repeater encodes the 2-line data into the single transmission signal by generating a single signal pulse in the single transmission signal at each state change of a first component of the 2-line data.

7. The system of claim 4, wherein the e2pwr repeater encodes the 2-line data into the single transmission signal by generating a pair of signal pulses in the single transmission signal at each state change of a second component of the 2-line data.

8. The system of claim 4, wherein the e2pwr repeater encodes the 2-line data into the single transmission signal by generating a sine wave in the single transmission signal having a peak value at each state change of the 2-line data.

9. The system of claim 4, wherein the second e2pwr repeater is further configured to encode second 2-line data into a second single transmission signal.

10. The system of claim 9, wherein the e2pwr repeater is further configured to receive the second single transmission signal encoded with the second 2-line data and decode the second single transmission signal to recover the second 2-line data from the second single transmission signal.

11. A method, comprising:
- receiving 2-line data in an embedded Universal Serial Bus (eUSB) format; and
- encoding the 2-line data into a single signal, wherein the single signal comprises a first symbol corresponding to a first state change of the 2-line data and a second symbol corresponding to a second state change of the 2-line data;
- wherein the second symbol comprises a first pair of signal pulses having a first rising edge corresponding to a rising edge in a second component of the 2-line data and a second pair of signal pulses having a first rising edge corresponding to a falling edge in the second component of the 2-line data.

12. The method of claim 11, further comprising decoding the single signal to recover the 2-line data.

13. The method of claim 11, wherein the first symbol comprises a first signal pulse having a rising edge corresponding to a rising edge in a first component of the 2-line data and a second signal pulse having a rising edge corresponding to a falling edge in the first component of the 2-line data.

14. The method of claim 11, wherein the first symbol comprises a first sine wave, and wherein the second symbol comprises a second sine wave.

* * * * *